March 22, 1960     D. D. DEMAREST ET AL     2,929,100
FRANKFURTER CASING SIZING DEVICE
Filed July 1, 1957                                      6 Sheets-Sheet 1
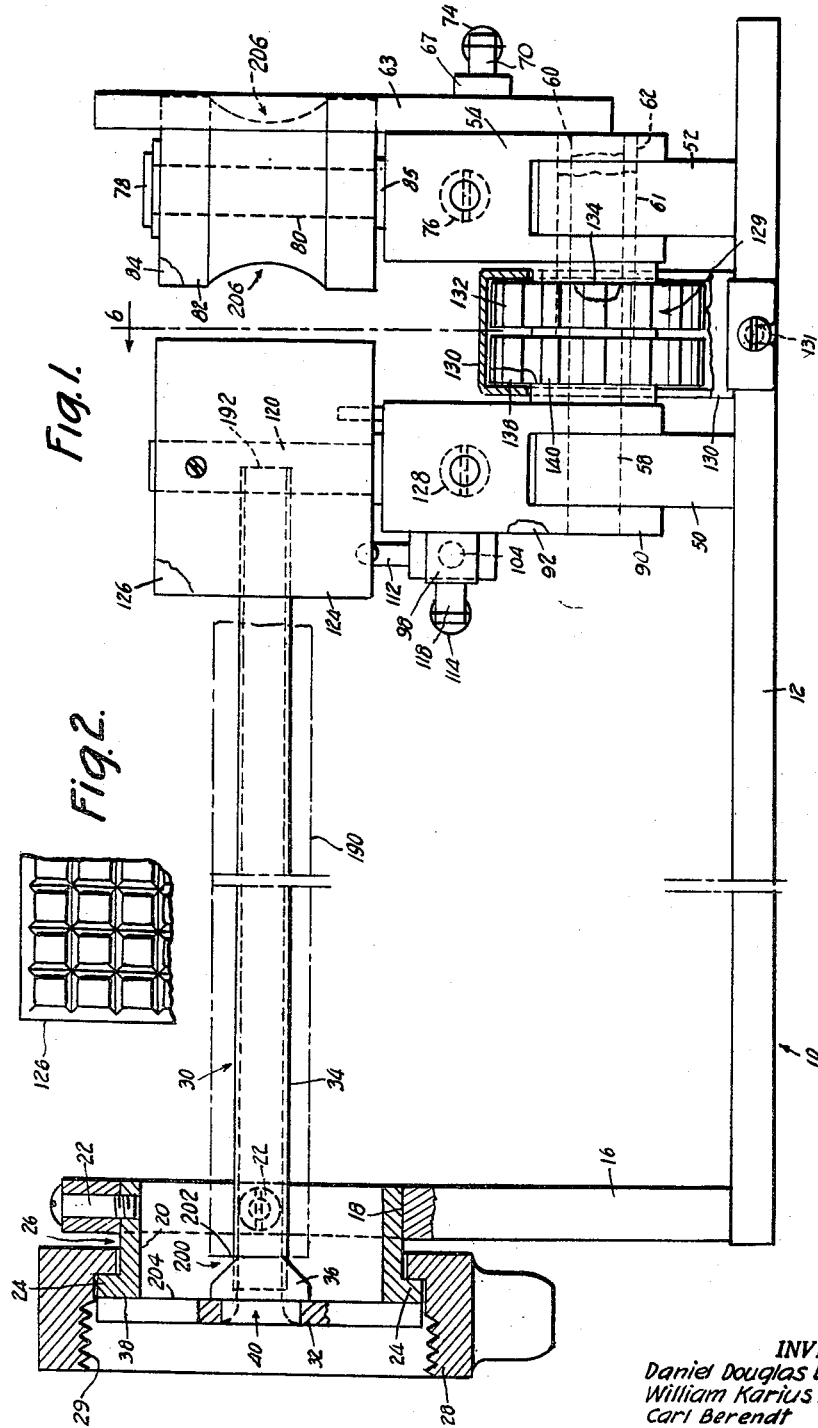
INVENTOR.
Daniel Douglas Demarest,
William Karius and
Carl Berendt
BY *Moser, Nolte + Nolte*
                 Att'ys

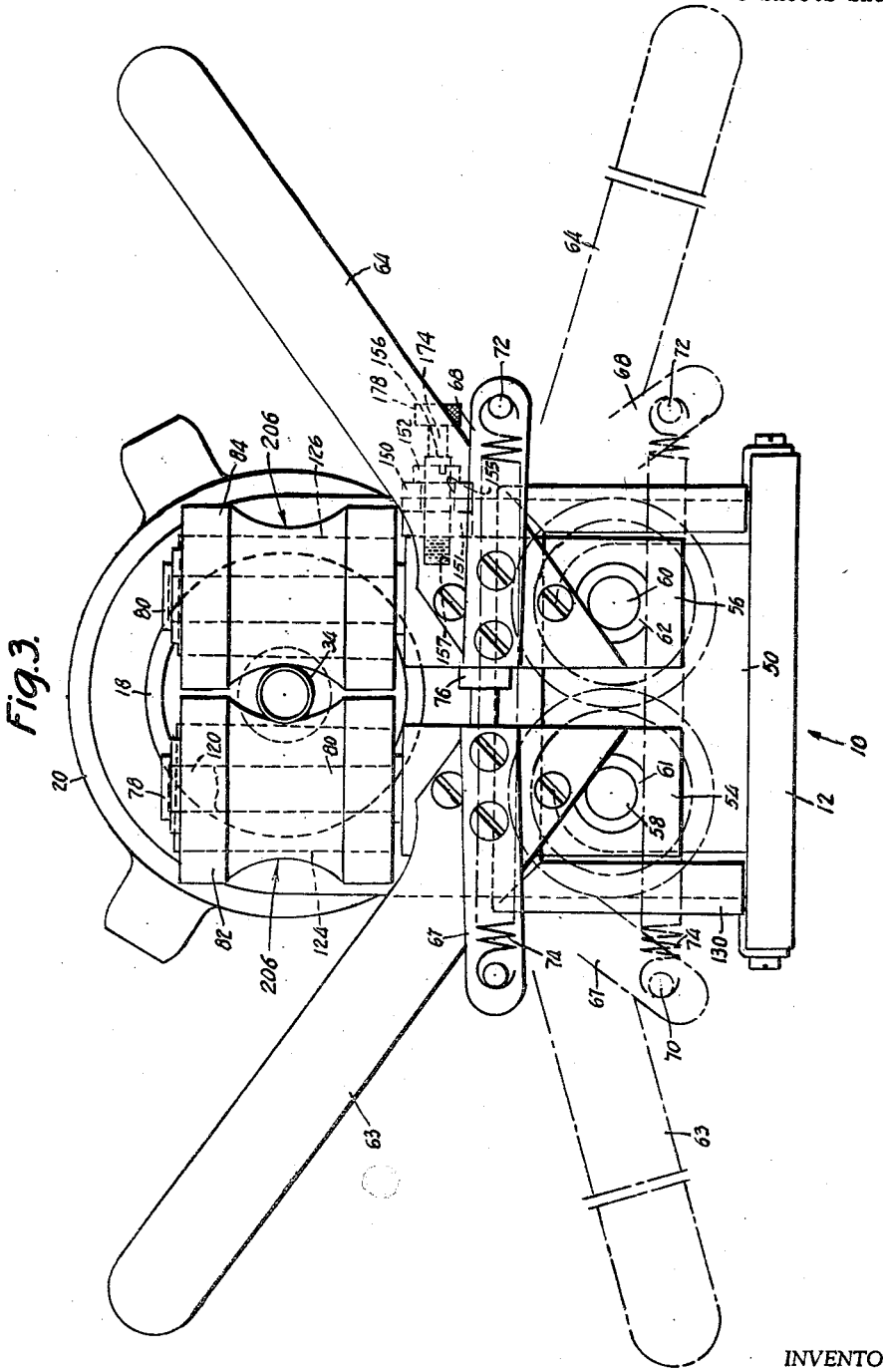

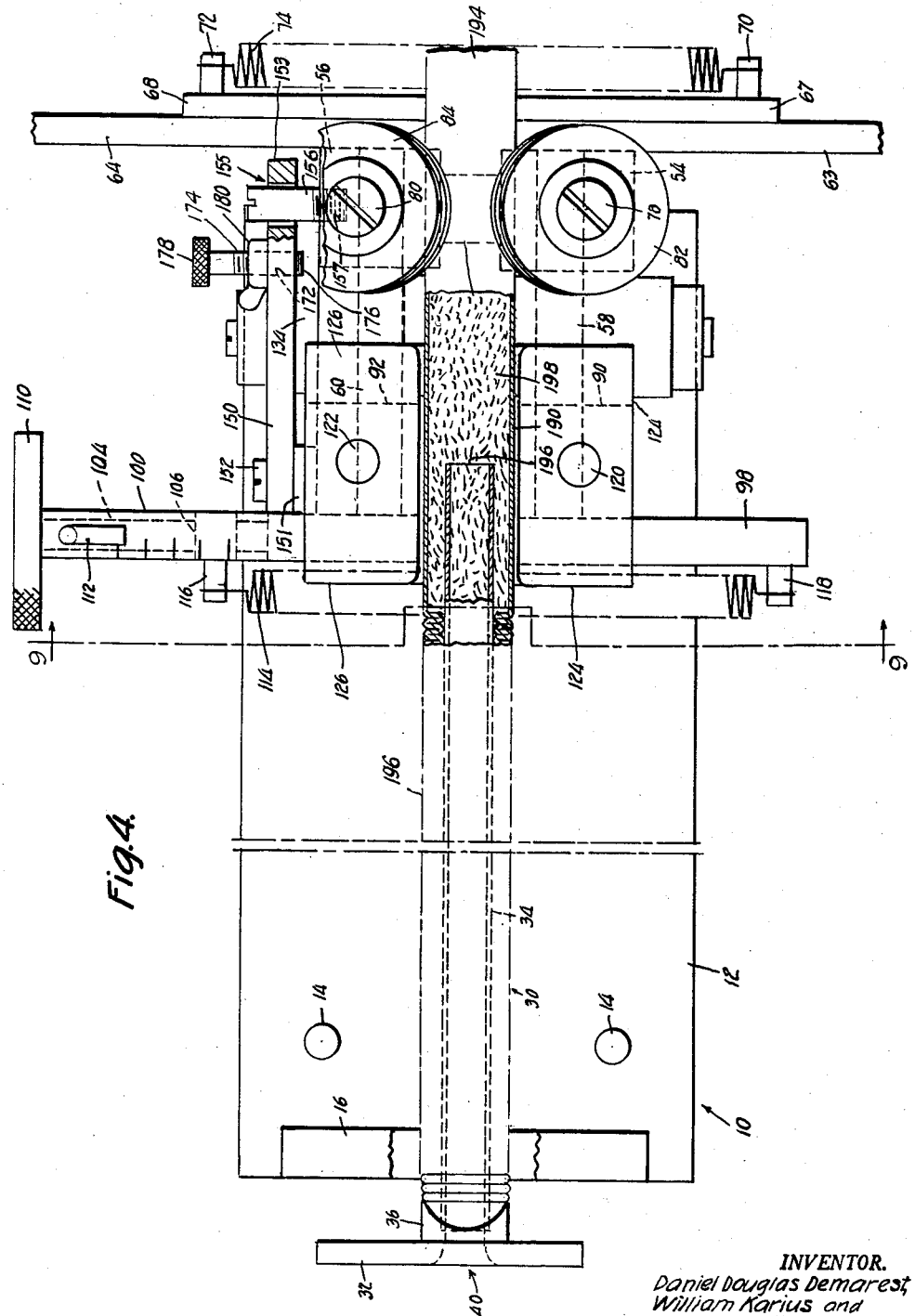

March 22, 1960

D. D. DEMAREST ET AL 2,929,100

FRANKFURTER CASING SIZING DEVICE

Filed July 1, 1957

INVENTOR.
Daniel Douglas Demarest,
William Karius and
Carl Berendt

BY
Moses, Nolte & Nolte
Att'ys

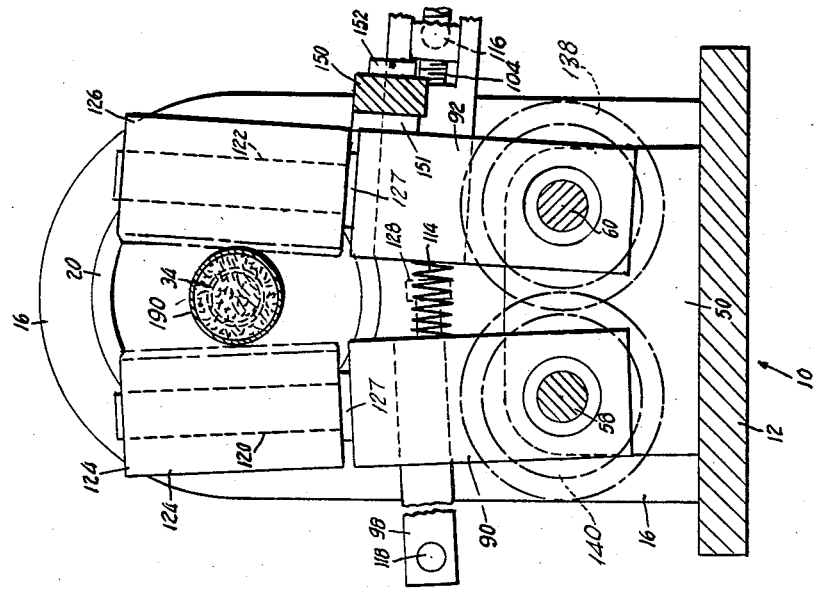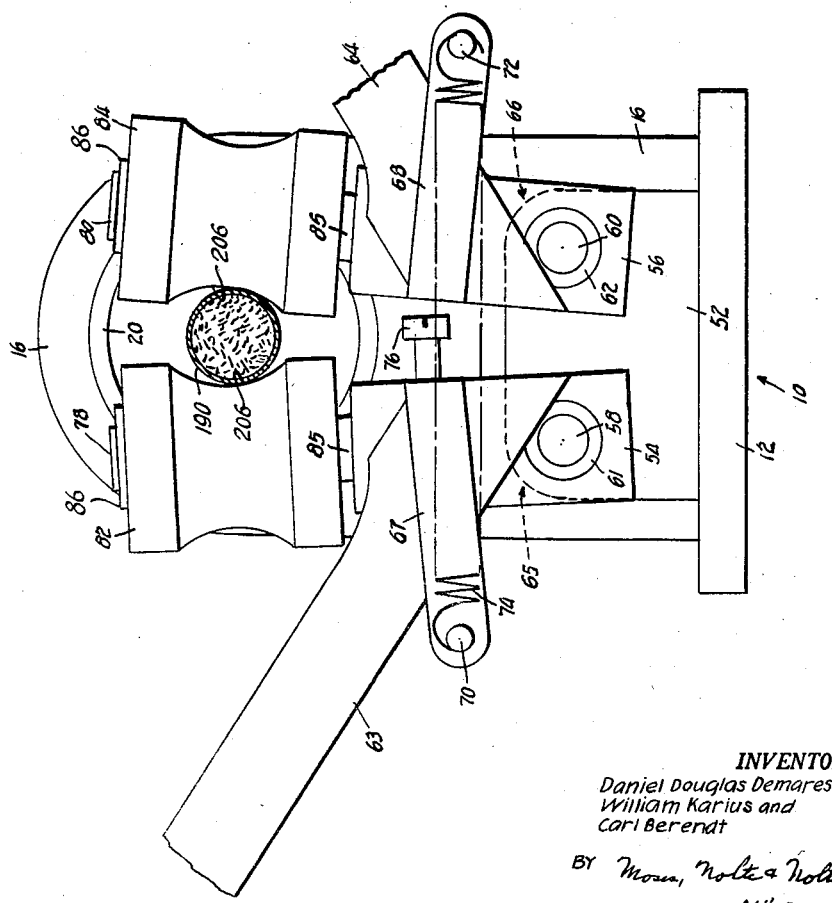

March 22, 1960   D. D. DEMAREST ET AL   2,929,100
FRANKFURTER CASING SIZING DEVICE
Filed July 1, 1957   6 Sheets-Sheet 6
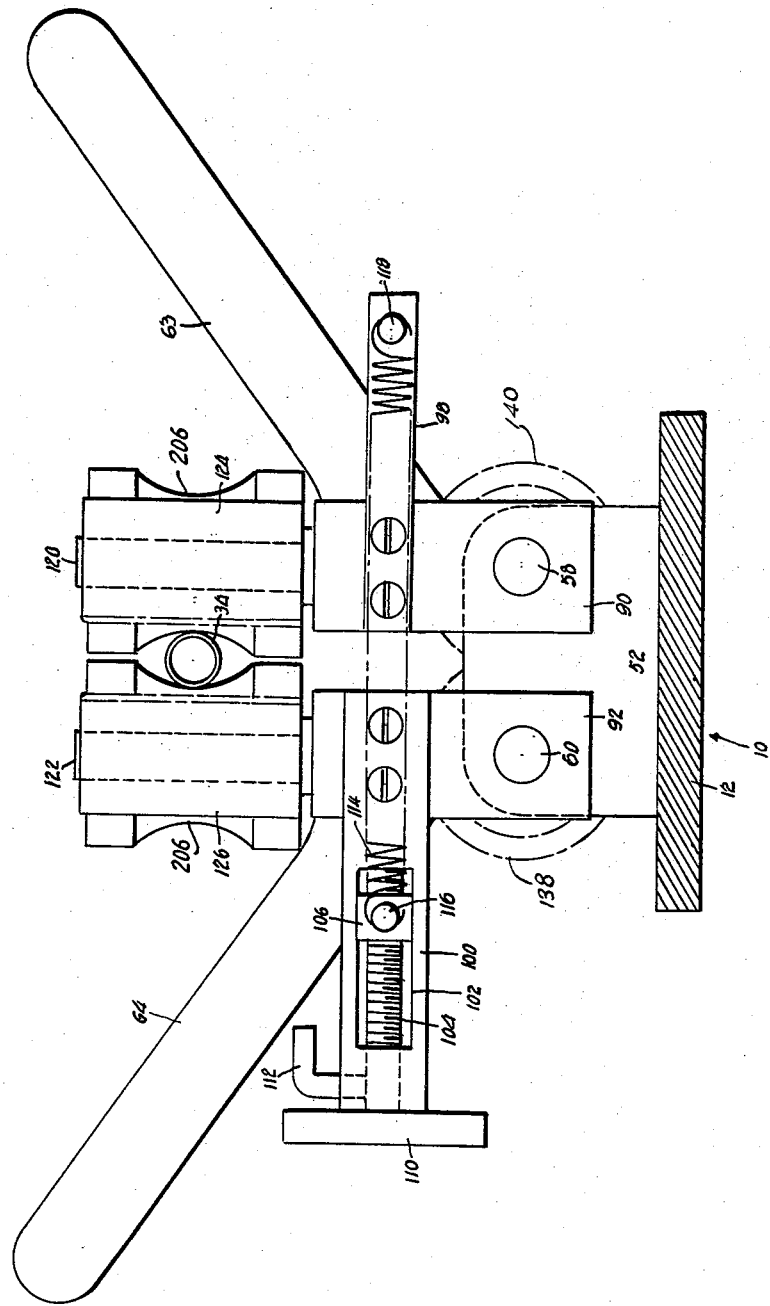
INVENTOR.
Dariel Douglas Demarest,
William Karius and
Carl Berendt
BY Moser, Nolte & Nolte
Att'ys United States Patent Office 2,929,100
Patented Mar. 22, 1960

2,929,100

FRANKFURTER CASING SIZING DEVICE

Daniel D. Demarest, Port Washington, N.Y., and William Karius, Mountainside, and Carl Berendt, Short Hills, N.J., assignors to Linker Machines, Inc., Newark, N.J., a corporation of New York Application July 1, 1957, Serial No. 669,266

11 Claims. (Cl. 17—35)

This invention relates to a frankfurter casing sizing device.

It is an object of the invention to provide a device operable on a shirred casing being filled with frankfurter meat emulsion, wherein the diameter of the casing will be maintained uniform throughout its length.

It is another object of the invention to provide means to control the diameter of the frankfurter casing.

It is yet another object of the invention to provide means to release air entrained in the frankfurter meat emulsion by the air pressure operated meat stuffing machine, before the meat emulsion enters the casing.

For other objects and a better understanding of the invention, reference may be had to the following detailed description taken in conjunction with the accompanying drawings in which:

Fig. 1 is a side elevation, partly in section with parts broken away of the frankfurter making machine;

Fig. 2 shows a portion of one of the pressure blocks as indicated in line 2—2 of Fig. 6;

Fig. 3 is an end view of the right side of the machine as seen from Fig. 1, the parts being in closed position in full lines, some of the parts being in open position in dot-dash lines.

Fig. 4 is a top plan view with parts in section of the machine showing the pressure blocks and the sizing rollers expanded by the filling of the casing;

Fig. 7 is an end view similar to Fig. 3 with parts in operating position and showing the casing filled;

Fig. 8 is a view similar to Fig. 6 with the parts in operating position and showing the casing filled; and Fig. 9 is a rear view of the machine in section taken on line 9—9 of Fig. 4.

Figures 5, 6:
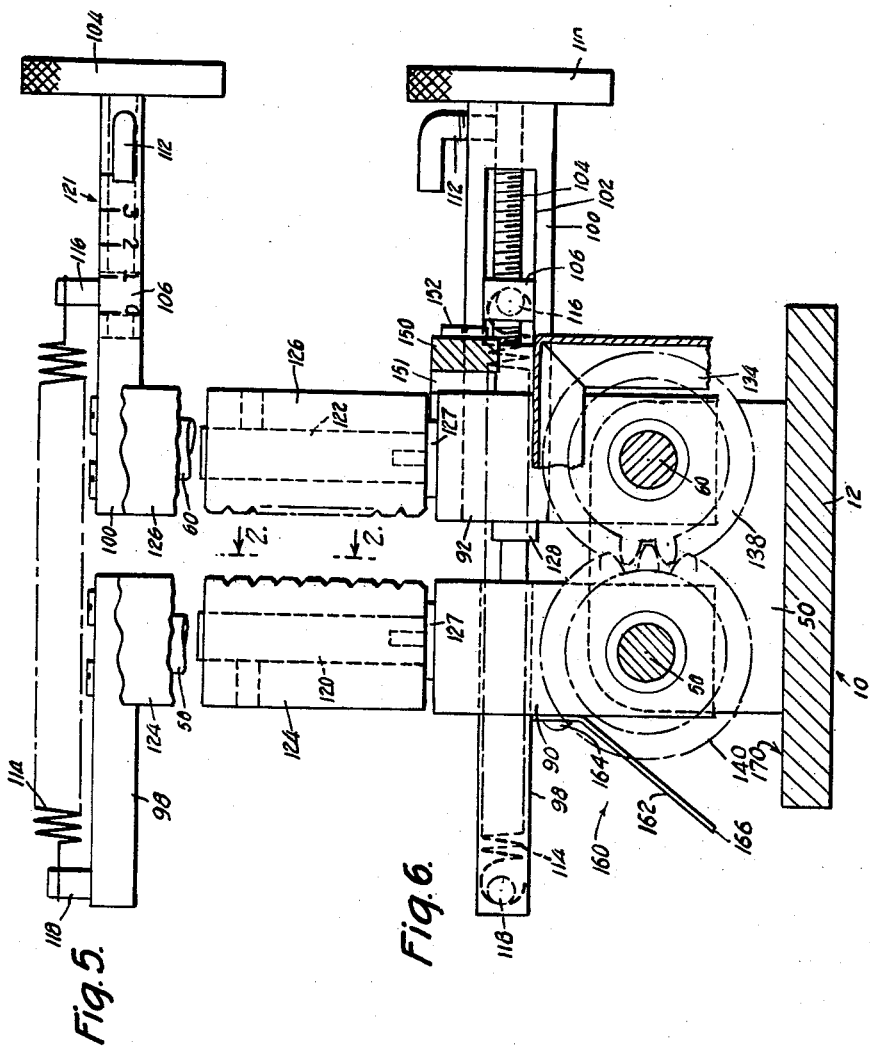
Fig. 5 is a fragmentary top plan view of Fig. 6 showing the spring tensioning device for the pressure blocks.
Fig. 6 is a section taken on the line 6—6 of Fig. 1 with parts broken away.

In commercial practice, it is necessary to present for customer purchase, a certain number of frankfurters in a package and a package of specified weight. It is highly desirable that all packages be of identical weight, or as close as possible, in order that a single price may be charged rather than a different price for each package. In addition, the packages should all be of uniform size so as to present an attractive display for prospective customers.

The present practice is to establish a minimum package weight, for example, one pound below which the weight of the package must not go. However, variations in the weight of the individual frankfurters in a package, resulting from differences in the diameter of the frankfurter, will result in weight variances in packages.

Present conventional hand controlled sizing results in variation in the diameter of the frankfurter casing, and, therefore, some packages weigh slightly more than the desired weight. It is, therefore, necessary to either include this overweight and give the customer the extra weight, or to employ a weight maker.

A weight maker is used in the factory production line to assemble the frankfurters to be included in a package. If the weight of this group of frankfurters was in accordance with the preselected weight, for example, one pound, he would pack that number in the package. If the weight was, for example, one pound, three ounces, he would by sample mixing with other individual frankfurters, replace one or more of the frankfurters and, by trial and error, arrive at a weight as close to one pound as possible.

This method of using weight makers is costly and expensive in that it generally slows down the speed of production. Therefore, the manufacturer has either the choice of giving away one pound, three ounces of frankfurter meat at the price of one pound of meat (which is on a large mass production operation extremely impractical and costly), or of attempting to save the extra weight by paying additional manufacturing costs for inspection and weight makers.

In either case, the total cost of producing a package of frankfurters is increased.

The present invention is directed to an automatic machine adapted to stuff frankfurter meat into a casing where a uniform diameter of the casing will be maintained along its entire length.

With reference to the drawings:

The frankfurter casing sizing device generally indicated at 10 (Figs. 1 and 4), including a base plate 12, is fastened by means of screw threads 29 to a hopper (not shown) containing meat emulsion.

A bracket 16 is mounted at the left end of this base plate 12 as seen in Fig. 1, and has an opening 18 therethrough. A bushing 20 extends through the opening and is fixedly held in place by set screws 22 (only two shown in Fig. 1). The bushing is flanged at 24 to form a seating groove 26 which receives locking member 28 for a purpose to be hereinafter described.

A horn assembly 30 extends through opening 18 and is composed of disc 32 and horn 34 which are suitably connected in air tight engagement. The disc 32 abuts tightly against the outer face 38 of flange 24 and has an opening 40 substantially at its center. The horn 34, which is a hollow cylindrical tube, is supported to extend perpendicularly to the plane of disc 32, and in communication with opening 40.

When the disc 32 is placed flush against edge 38 of flange 24, the horn 34 will extend substantially horizontally to the right as seen in Fig. 1.

A hopper (not shown), in which the meat emulsion is contained under constant air pressure, is connected to the opening 40 so that when a valve (not shown) is opened the meat emulsion will be forced through the opening 40 and directed along horn 34. Lock 28 is threaded at 29 on its interior so that it will hold disc 32 and flange 24 in air tight relationship when screwed into a conventional discharge connection from the hopper. Since this method of attachment is not an essential part of this invention, only that part which it is believed necessary to a proper understanding of this invention has been shown and described.

At the right hand end of base 12 is a pair of upstanding brackets 50, 52 fixedly mounted thereto. On the bracket 52 (Figs. 1 and 7) a pair of U-shaped bifurcated links 54, 56 are pivotally mounted on shafts 58, 60 extending therethrough. These links are suitably connected to bushings 61, 62 which freely rotate about shafts 58, 60. Handles 63, 64 are fastened by welding, soldering, screws or other conventional means, on the front faces 65, 66 of links 54, 56 and arms 67, 68 extend outwardly and slightly downwardly from handles 63, 64.

Posts 70, 72 are positioned at the outward extremity of these arms and a tension spring 74 is fastened between these posts. This spring 74 tends to exert a constant pressure to bring the links 54, 56 together. Adjustable screw 76 is threadedly received into link 54 and acts as a limiting stop to keep the links separated by a calculated amount.

On the top of links 54, 56 are posts 78, 80 which rotatably support the sizing or gauging rollers 82, 84, having concave faces. These rollers rest on the shoulders 85 of posts 78, 80 and retainers 86 may be used to maintain the rollers 82, 84 in correct alignment on posts 78, 80 (Fig. 7) and to prevent wear when these rollers are rotating. Spring 74 acts to force rollers 82, 84 towards each other in the same manner as it acts to force links 54, 56 together.

A pair of pivoting U-shaped bifurcated links 90, 92 similar to links 54, 56, are fixed to the portion of shaft 58, 60 which extends through bracket 50 (Fig. 9).

A pair of arms 98, 100 (Figs. 5-6 and 9) extend laterally in opposite directions from links 90, 92 respectively. The arm 100 has an opening 102 through which extends the rotatable screw shaft 104. The shaft is supported in the arm 100 at the ends of opening 102 so that as handle 110 is turned the block 106 will be, by means of the threads on shaft 104, moved to either the left or right in opening 102 as seen in Fig. 9. A lock pin 112 (Fig. 6) is provided so that when block 106 is in its desired position, the shaft 104 will be locked and further movement of block 106 prevented. A tension spring 114 is stretched between post 116 on block 106 and post 118 on the outer extremity of arm 98 to exert compressive force to attract links 90, 92 together. By shifting the position of block 106 along shaft 104, the amount of this pressure may be adjusted for a purpose to be hereinafter described. A scale 121 may be provided on a surface of arm 100 which will assist the operator in adjusting the desired tension in spring 114.

As seen in Fig. 8, at the top of links 90, 92 are posts 120, 122 and a pair of pressure blocks 124, 126 are attached to these posts. These blocks may be held secure to the posts by friction fit, screws or any other suitable or conventional means and rest on shoulders 127 of shafts 120, 122. The faces of the blocks (Fig. 2) are roughed somewhat like a waffle to keep a firm grip on the casing transported therebetween. An adjustable stop 128 is threadedly received into link 90 to act as a limiting stop to oppose the tension of spring 114 as desired and to keep the links 90, 92 separated.

Referring now to Fig. 1, a gear assembly 129 is mounted between brackets 50, 52 and a removable cover 130 is affixed by a screw 131, or other suitable or conventional means, to base 12 to cover this gearing. This assembly 129 includes the meshed gears 132, 134 (Fig. 6) and a similar pair of meshed gears 138, 140. The meshed gears 132, 134 affixed to links 54, 56 respectively freely rotate about shafts 58, 60 in bushings 61, 62 and result in equal but opposite pivotable movement of these links.

The gears 138, 140 are fixedly connected to the shafts 58, 60 and to the links 90, 92 respectively and will result in equal but opposite pivotable movement of these links 90, 92.

In order to effect spreading of pressure blocks 124, 126 and the rollers 82, 84, linkage interconnecting link 56 and link 92, has been provided as will now be described.

One end of a bar 150 (Figs. 3 and 4) is fixedly mounted by set screws 152 to link 92 and the opposite end 153 extends toward the link 56. This opposite end 153 of bar 150 does not rest against the surface 154 of link 56, but is spaced therefrom by means of supporting block or shive 151. This space between extremity 153 of bar 150 and the surface 154 of block 56 provides a certain amount slack or play distance for a purpose to be hereinafter described. This shive 151 may be of any desired width so that the slack distance may be as extensive or restricted as desired.

Through the extremity 153 of bar 150, at a position substantially opposite to the surface 154 of link 56, is an opening 155 through which a screw or pin 156 extends, the pin being received into surface 154 of block 56 by threads 157.

When a downward pressure is exerted on the handles 63, 64, and the links 54, 56 are pivoted outwardly against the tension in spring 74, link 56 will pass through the slack distance and surface 154 of link 56 will engage the extremity 153 of bar 150. Continuous pressure on the handles 63, 64 will force the bar 150 outwardly and carry with it the link 92 against the tension in spring 114.

Links 90, 92 connected by mesh gears 138, 140 as hereinabove described, will then pivotably move in opposite directions. Since the mesh gears 132, 134 interconnect links 54, 56, by the hereinabove described movement of the handles 63, 64 the sizing rollers 82, 84 and the pressure block 124, 126 will be spread apart.

As the downward motion of the handles is continued, and the links 54, 56 90, 92 are spread apart, as the springs pass the over center position, they will tend to induce pressure to force the links farther apart. In order to limit the spreading movement of the links and the rollers hereinabove discussed, stop 160 (Fig. 6) has been provided. This stop includes an arm 162 fixedly mounted by screws 164 to a surface of link 90 extending outwardly and downwardly, so that as the links are pivoted outwardly, the lower extremity 166 of arm 162 would come to rest substantially on the upper surface 170 of platform 12, thereby limiting the spreading movement of the links. Further spreading of the links 54, 56 is prevented through the medium of the extremity 153 of bar 150 which engages surface 154 of link 156.

When the links 54, 56 90, 92 and the sizing rollers 82, 84 and the pressure blocks 124, 126 are held apart, if an upward pressure is placed upon the handles 63, 64 so as to pivot the handles upwardly and move the springs over the dead center position, the tension in springs 74, 114 will cause the blocks, rollers and links to return to their original position along the path of the frankfurter casing to the limits determined by the stops 76 and 128.

In addition to the shive 151, by means of which as hereinabove described, the slack distance is adjusted, there are provided additional means to adjust the lateral distance that the link 56 may be moved before it causes a corresponding movement in links 90, 92, as the handles 63, 64 are depressed.

Referring to Fig. 4, a threaded opening 172 is provided in bar 150 to receive the threaded spacing screw 174. The extremity 176 of this screw 174 by means of knob head 178 of the screw, may be adjusted relative to the surface 154 of link 56. A lock nut 180 is provided on this spacing screw so that after the desired position of extremity 176 of spacing screw 174 has been set, the spacing screw may be locked into position.

In this manner, minor adjustments to reduce the amount of slack distance may be made by an adjustment of the screw 174 so as to position the extremity 176 at a selected position intermediate its first position (which is flush against the surface 154 of link 56) and a second position (where it would not protrude beyond the inner surface of the bar 150). In this manner, the slack distance may be adjusted as the operator of the machine desires, in order to achieve the slack distance or play distance which results in maximum operational efficiency.

When the screw 174 is adjusted, so as to be in its first position (i.e., flush against the surface 154 of link 56) it then becomes possible to remove the spring 74 from the device. This follows as the bar 150 will now act as a direct connecting link to transmit the pressure exerted by spring 114, hereinabove described as acting only on links 90, 92 directly to the links 54, 56.

When the machine is to be set up for operation, a casing 190 for the frankfurter emulsion, which is about 55 to 80 feet long, must first be threaded over the hollow horn 34. This is accomplished by exerting downward pressure on the handles 63, 64 so as to spread the links, blocks and rollers as hereinabove described to expose the horn.

Referring to Fig. 4, it is seen that the extremity 192 of horn 34 extends to a position substantially half the length of the pressure blocks 124, 126 and as hereinbefore explained, horn 34 is maintained substantially horizontally.

In commencing operation, after the casing has been threaded over the hollow horn, the end 194 of the casing 190 is pulled slightly off the extremity of the horn 34, approximately one foot, and held upwards so that the casing does not fall into the gear mechanism 129 hereinabove described.

The operator of the apparatus turns a valve (not shown) upon the hopper (not shown) and feeds frankfurter meat emulsion 196 under constant pressure, through the opening 40, through the hollow interior horn 134 and into the casing at 198, which has been pulled off the horn extremity 192. Any air which has become entrained with the meat while under pressure, escapes from the casing by flowing rearwardly in a counter direction along the outside of the horn 34 and escapes through the opening 200 between the end 202 of the casing and the surface 204 of disc 32. The end 194 of the casing has been pinched closed by the operator, and the meat emulsion 196 being forced into the casing, expands the casing to form a plug of meat emulsion or a block against this closed end 194. The pressure of the entering meat emulsion acting against this plug, will commence to pull the shear casing 190 off horn 34.

At this time, an upward rotation is placed upon handles 63, 64 and the rollers 82, 84 and pressure blocks 124, 126 spring back into the original position as shown in Fig. 7, as pin 156, raised by link 56, contacts bar 150 to raise link 92, overcoming the tension in springs 74, 114 as hereinbefore described. The block or plug of meat emulsion, hereinabove described, is now positioned so as to be threaded between the respective concave cut-out portions 206 of the rollers 82, 84.

Stop 128 threadedly received in link 90 prevents links 90, 92 from moving too close together so that pressure blocks 124, 126, under a tension of spring 114 cannot press casing 190 against the horn 34 in such a manner to completely prevent the movement of the casing off the horn. An adjustable stop 76, threadedly received into link 54, prevents the links 54, 56, supporting rollers 82, 84, from moving too close together.

After this initial operation, the rollers 82, 84 and the pressure blocks 124, 126 having been re-positioned as hereinabove described, the rollers 82, 84, under the tension of spring 74, exert a pinching action on casing 190. This pinching pressure being sufficient to slightly retard the free movement of the casing (after it has left the pressure blocks 124, 126 and the extremity 192 of horn 34, under the pressure of the meat emulsion) and acts in much the same manner as did the meat emulsion block or plug, as hereinabove described, in initially expanding the casing.

Therefore, during normal operation, meat emulsion 196 enters the casing 190 through horn extremity 192 and the casing 190 is pulled off the horn 34 against the pressure of the pressure blocks 124, 126 by the pressure of this meat emulsion. This constant meat emulsion pressure tends to expand the casing against the pinching action of rollers 82, 84 between the cut-out portion 206 and the extremity of the pressure blocks 124, 126 nearest these rollers. Thus, a continuous pathway for the casing being forced off the horn by the constant pressure of the meat emulsion is determined and maintained by the horn 34, the pressure blocks 124, 126 and the sizing or gauging roller concave cut-out 206.

It is seen that the casing 190 as it proceeds through the machine under the force of the meat emulsion moving through horn 34, is frictionally gripped on either side by pressure blocks 124, 126 which retards the casing 190 moving off the horn 34. This pressure determines the casing diameter by its relation to the force of the hereinabove described pinching pressure of the rollers 82, 84 and the hereinabove recited constant pressure action on the meat emulsion.

Since the pinching pressure of the rollers 82, 84 is constant, by reason of spring 74, and the pressure on the meat emulsion is also constant, in order that the diameter of the filled casing may be selectively adjustable during operation, we have provided means to adjust the frictional pressure being applied to casing 190 by the pressure blocks 124, 126.

The operator by rotating handle 110 will shift the position of block 106 on shaft 104 and thereby vary the tension in spring 114 held between posts 116 and 118.

By adjustment of the tension on spring 114, the pressure applied upon the blocks 124, 126 can be increased or decreased so that the diameter of the frankfurter casing may be selectively adjusted so as to be maintained as nearly as possible to the desired gauge diameter to achieve the correct weight for the individual frankfurters in the casing. Furthermore, by use of scale 121, the settings for the complete length of the casing to produce the desired diameter, can be pre-set after sufficient experience in operation is gained.

During normal operation, it is often desirable to make minor adjustment of the pinching pressure being exerted by rollers 82, 84, so as to relieve some of the pressure on the casing 190, and yet not alter the setting of the tension of spring 114. For this purpose, the slack distance hereinabove described has been provided.

As the operator presses down on handles 63, 64, he will cause a separating of rollers 82, 84 through the action of gears 132, 134. However, no corresponding movement of pressure blocks 124, 126 will be caused until the surface 154 of link 56 has passed through the slack distance and engaged extremity 153 of bar 150.

Referring to Fig. 4, the opening 155 is slightly greater in diameter than the pin 156 to allow for some movement of pin 156 in the vertical direction, without pin 156 contacting the bar 150, so that adjustment can be made.

This slack distance may be desirable in certain instances to allow minor movements or adjustment of the position of links 54, 56 without any corresponding movement of links 90, 92 so that the operator may slightly reduce the pinching pressure being exerted by rollers 82, 84 on the casing in the concave cutout 206 without effecting the pressure of pressure blocks 124, 126 on the casing 190 at the extremity 192 on horn 34.

It is understood, however, that if the screw 174, hereinbefore described, is positioned so that extremity 176 is flush against the surface 154 of link 56, this slack or play distance would be eliminated, and that the hereinabove described minor adjustment of the pressures would not be possible. The amount of adjustment possible, in any event, would be dependent upon the amount of slack or play distance which the operator would provide by positioning the extremity of the screw 176, as was hereinbefore discussed.

It is therefore seen that the casing, as it is forced off the horn, passes between the pressure blocks 124, 126 and the outer surface of horn 34 and through the concave cut-out portion 206 in the sizing and gauging rollers 82, 84 respectively. The individual rollers and pressure pads are disposed, one each upon opposite sides of the casing, and determine a continuous pathway through which the casing is forced by the constant pressure of the meat emulsion. The cooperation of the pressure of the meat emulsion with the pressure of the pressure blocks 124, 126 on the casing, and with the pinching pressure of the rollers 82, 84 on the casing after it leaves the pressure blocks, determines the diameter of the casing as it exits from rollers 82, 84 to be conveyed by said above means to the linking machine for subsequent processing.

The operation of the machine is as follows: The machine is set for a pre-selected sausage size by adjusting the knob 110 to set the tension on the spring 114. Sausage is then fed through the horn and the size of a sausage formed is observed. Normally the rollers 82 and 84 will move outwardly when subjected to an oversized sausage. The linkage 150 as controlled by a knob setting 178 will be moved by the outward movement of the roller 84 only after the roller 84 has moved a predetermined amount, as controlled by the setting of the knob 178. Reduction of the loss motion between movement of the roller 84 and the blocks 124 and 126 is effective to cause a faster outward response movement of the blocks 124 and 126 whenever an oversize sausage is fed between the rollers 82 and 84 to cause them to move further apart. Outward movement of the blocks 124 and 126 permits faster feeding of the sausage and hence results in the formation of smaller diameter size sausage since the casing is moved off the horn at a much faster rate.

Adjustment of the knob 178 so that the loss motion between the outward movement of roller 84 and the link 150 is increased will produce a sausage of slightly larger diameter size. This is so because the rollers 82 and 84 move outwardly a further amount before they effect an outward response movement of the blocks 124 and 126 and hence the blocks 124 and 126 retard the forward speed of the sausage until it is filled to a larger diameter size.

We have described what we believe to be the best embodiments of the invention. We do not wish, however, to be confined to the embodiments shown, but what we desire to cover by Letters Patent is set forth in the appended claims.

We claim:

1. A casing sizing device comprising a base, an elongated horn mounted on said base and adapted for the feeding of material, a casing surrounding said horn and extending over one end thereof in a position to cause material which is fed through said horn to fill said casing and cause it to move off said horn in the direction of feed, first casing sizing and guiding means including means pivotally mounted on said base in the vicinity of the end of said horn and resiliently biased against said casing as it is being filled, and second casing sizing and guiding means pivotally mounted on said base in the vicinity of the discharge of said first means and resiliently biased against said filled casing.

2. A casing sizing device according to claim 1, wherein said first and second casing sizing and guiding means are adjustable.

3. A casing sizing device as in claim 1, wherein said first and said second means each have portions symmetrical about the axis of the horn, and means connected to said first and second means for pivoting the portion of the first and second means on either side of the axis as a unit.

4. A casing sizing device as in claim 3, wherein said pivoting means includes coupling means for causing the movement of the portions of the first and second means on one side of the axis to produce a reciprocal movement of the portion on the other side of the axis.

5. A casing sizing device as in claim 4, wherein said first means includes adjustable means adapted to control the amount of pressure applied by said first means on said casing.

6. A casing sizing device as in claim 5 wherein said first means includes at least one pressure block having a roughened face.

7. A casing sizing device as in claim 5 wherein said second means includes at least one sizing roller having a concave cut-out portion intermediate its length.

8. A casing sizing device as in claim 7 wherein said cut-out portion acts as a guide slot to determine the path followed by said casing as it leaves said first pressure means.

9. In a sausage making machine including an elongated horn for the feeding of sausage material therethrough, a casing surrounding said horn and extending over one end thereof in a position to cause material which is fed through the horn to fill said casing and cause it to move off said horn in the direction of feed, the improvement comprising elongated means adjacent the end of said horn and extending therebeyond, said means being biased against said casing to confine the sausage as formed to a predetermined diameter, means operatively associated with said elongated means for adjusting the biasing pressure of said elongated means and constant pressure sausage sizing and feed control means spaced from said elongated means in a direction of feed.

10. A sausage making machine according to claim 9 including linkage means connecting said elongated means and said constant pressure sausage sizing and feed control means and effective upon outward movement of the latter against said biasing to move said elongated means but being free to move in an opposite direction without affecting the latter.

11. In a sausage making machine including an elongated horn for the feeding of sausage material therethrough, a casing surrounding said horn and extending over one end thereof in a position to cause material which is fed through the horn to fill said casing and cause it to move off said horn in the direction of feed, the improvement comprising elongated pressure blocks extending from a position slightly to the rear of the forward end of the horn to a position extending slightly therebeyond in the direction of feed, means operatively associated with said elongated pressure blocks for biasing said pressure blocks inwardly into contact with said sausage casing to confine the sausage as formed to a predetermined diameter, a roller spaced forwardly in the direction of feed from said sizing blocks on each side of said sausage feed, a pin on one of said gauging rollers extending outwardly therefrom away from said sausage being fed, a link connecting one of said sizing blocks and one of said rollers and having a slot opening through which said pin extends, and means for biasing said rollers against said sausage as it is fed whereby movement of said gauging rollers outwardly upon the passing through of an oversized sausage length is effective to move said pressure blocks outwardly and permit more rapid feeding until the sausage sizing is again reduced to a proper amount.

References Cited in the file of this patent

UNITED STATES PATENTS

| | | |
|---|---|---|
| 1,059,411 | Unversaw et al. | Apr. 22, 1913 |
| 1,610,008 | Hirsch | Dec. 7, 1926 |
| 1,759,587 | Parker | May 20, 1930 |
| 1,994,951 | Holmes et al. | Mar. 19, 1935 |